United States Patent [19]  [11] 3,907,055
Bertram et al.  [45] Sept. 23, 1975

[54] GAUGE MODIFIER FOR AN EXCAVATOR
[75] Inventors: August Herman Bertram; Stephen Harold Gill, both of Aurora, Ill.
[73] Assignee: Caterpillar Tractor Company, Peoria, Ill.
[22] Filed: May 31, 1974
[21] Appl. No.: 474,977

[52] U.S. Cl. ............................................. 180/9.48
[51] Int. Cl.² ......................................... B62D 55/00
[58] Field of Search.............. 180/9.48, 9.52, DIG. 2

[56] References Cited
UNITED STATES PATENTS

| | | | |
|---|---|---|---|
| 1,299,855 | 4/1919 | Nelson | 180/DIG. 2 |
| 1,705,578 | 3/1929 | Lichtenberg | 180/9.48 X |
| 2,165,551 | 7/1939 | Iverson | 180/DIG. 2 |
| 2,763,330 | 9/1956 | Potter | 180/9.48 |
| 3,487,802 | 1/1970 | Roy | 180/9.52 |

*Primary Examiner*—Kenneth H. Betts
*Assistant Examiner*—John A. Pekar
*Attorney, Agent, or Firm*—Phillips, Moore, Weissenberger Lempio & Strabala

[57] ABSTRACT

An excavator machine is provided with adjustable means for connecting the lower frame of a vehicle to the track roller frames so that the gauge width of the tracks of the vehicle can be adjusted. The adjustable connecting means includes a slot formed in each of the connecting arms for connecting the body to the track frame. The slot extends along a direction of adjustment of the tracks and is adapted to receive a guide and locking member. The guide and locking member is operative in a guiding position to guide the frames along the arms during the adjustment operation. Once the frame reaches the adjusted position, the members are inverted to their locking position to thereby lock the frames relative to the arms.

9 Claims, 4 Drawing Figures

GAUGE MODIFIER FOR AN EXCAVATOR

BACKGROUND OF THE INVENTION

The present invention relates to hydraulic excavators and pertains particularly to means for modifying the track gauge in order to improve stability of the machine.

Hydraulic excavators must be relatively stable in order to perform efficiently. The primary concern is preventing the vehicle from tipping over during heavy work cycles.

One approach to the improvement of stability for such excavators is the use of outriggers. However, outriggers unduly complicate the machine and are not wholly satisfactory.

Another approach to this problem is to increase the width of the vehicle. Such approach is satisfactory for smaller vehicles which can be sufficiently wide to have adequate stability and yet be sufficiently narrow to be transportable on public highways.

Larger excavator vehicles, however, when having sufficient width to provide satisfactory stability exceed the legal width limits for transportation on public highways. One approach to solving this problem has been to provide an adjustable width or adjustable gauge for the tracks of the vehicle. It is known, for example, to provide hydraulic systems for extending the width of the tracks when the vehicle is ready for operation. The system is then operative to retract the width of the tracks or draw the tracks inward for readying the vehicle for transportation on a truck or a flat car. Such systems, however, are expensive and complicated.

SUMMARY AND OBJECTS OF THE INVENTION

It is a primary object of the present invention to provide means for adjusting the gauge for the track vehicle.

Another object of the present invention is to provide simple and inexpensive means for adjusting the track gauge of a hydraulic excavator.

A further object of the present invention is to provide gauge width modifying apparatus for a track type hydraulic excavator wherein the modifying means includes guide means and locking means operative to guide the track assemblies to their respective adjusted positions and to lock them in place.

In accordance with the present invention, a gauge width modifying assembly for an excavator includes means for adjustably connecting the lower frame of the excavator vehicle to the track roller frames of the track assemblies. The adjustable connecting means includes guide means for guiding the assemblies to their inner and outermost positions and locking means for locking the members in their respective positions.

BRIEF DESCRIPTION OF THE DRAWINGS

The aforementioned and other objects and advantages of the present invention will become apparent from the following specification when read in conjunction with the accompanying drawings wherein.

DETAILED DESCRIPTION OF PREFERRED EMBODIMENT

Figure 1:
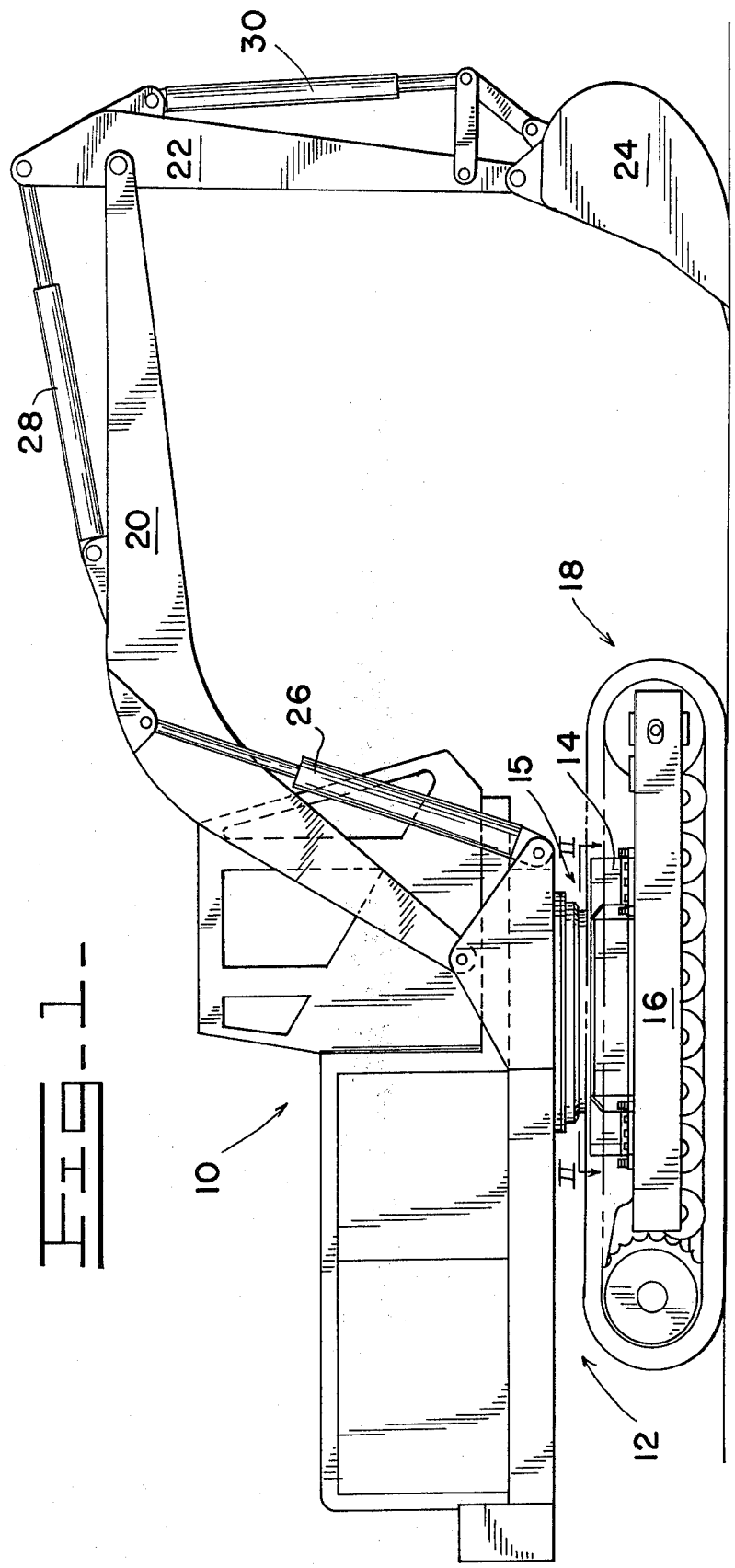
FIG. 1 is an elevational side view of an excavator incorporating the present invention.

Referring now to FIG. 1 of the drawings, there is illustrated an excavator machine generally designated by the numeral 10 of generally conventional construction having an upper frame 12 rotatably mounted on a lower frame 14 by means of a suitable swing mechanism shown generally at 15. The lower frame 14 usually referred to as a car body is secured by adjustable connecting means to be described below to a pair of laterally spaced track roller frames (one of which is shown). The track roller frames 16 are generally conventionally designed and support a plurality of rollers and drive sprockets on which is mounted an endless track generally indicated at 18.

The excavator machine includes a boom 20 pivotally supported to the upper frame as indicated with a stick 22 pivotally connected to the outer end of the boom and supporting at its outer end a bucket 24 pivotally secured thereto. A pair of boom lift cylinders 26 (only one of which is shown) are pivotally connected between the upper frame 12 and the boom 20 for raising and lowering the boom. A stick control motor 28 is operatively connected between the boom and the end of the stick 22 for pivotally moving the stick 22 with respect to the boom. A bucket motor 30 is pivotally connected at one end to stick 22 and the other end by means of suitable linkage means to bucket 24 for rocking the bucket around its pivotal axis.

Figure 2:
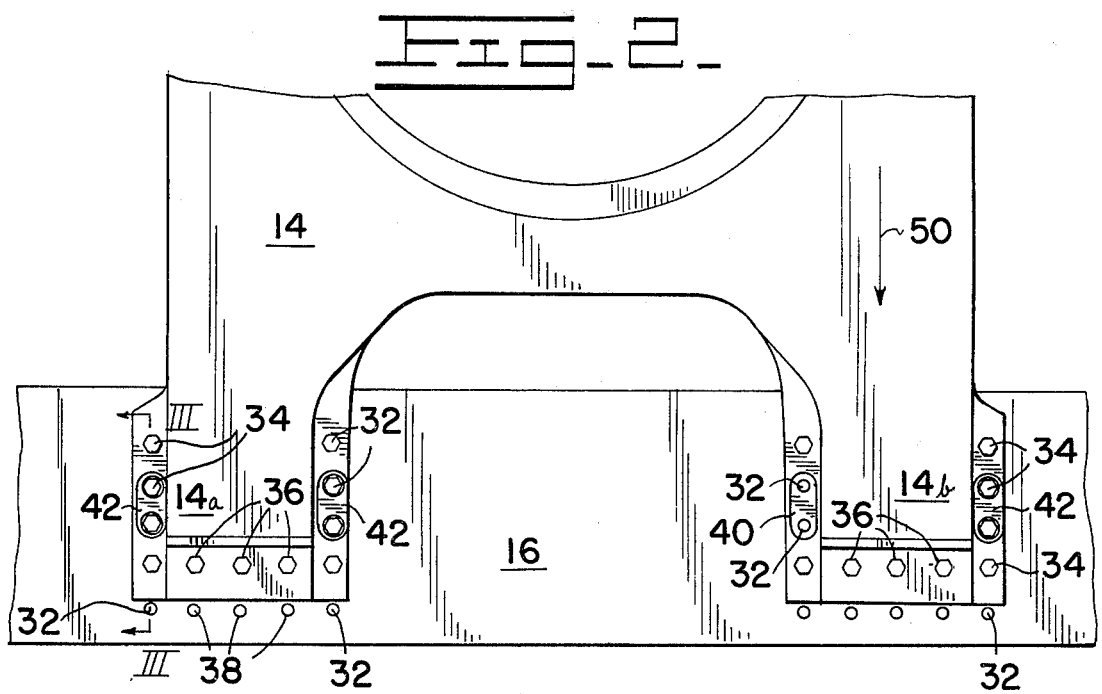
FIG. 2 is a view taken generally along lines II—II of FIG. 1.

Referring now to FIG. 2, there is disclosed and illustrated the adjustable connecting means for connecting the lower frame 14 to the track roller frames 16. The lower frame 14 includes a pair of arms or members 14a and 14b extending outward from the central portion of the main body for connection to the track roller frames. The connecting means includes parallel rows of bolt receiving bores extending through each of the arms 14a and 14b and into the track frames 16. These rows of bolt receiving bores extend along in a line with the direction of movement of the track frame for adjustment purposes. The embodiment as shown in FIG. 2 illustrates the track frame in its outermost position with a plurality of bolts or cap screws 34 ending through the bores in the arms 14a and into the bores in the track frames 16.

A second row of bolt receiving bores, not shown, receiving bolts 36 is formed in the outer end of each of the arms 14a and 14b. Corresponding inner and outer rows of bolt receiving bores are formed in the track frames 16. The inner bolt holes, not shown, now receive the bolts 36 as illustrated in FIG. 2. The outer bolt holes 38 receive the bolts 36 when the track is in its retracted or inboard position. These rows of bolt holes illustrate or indicate the inner and outermost positions of the track assembly 16.

Figure 3:
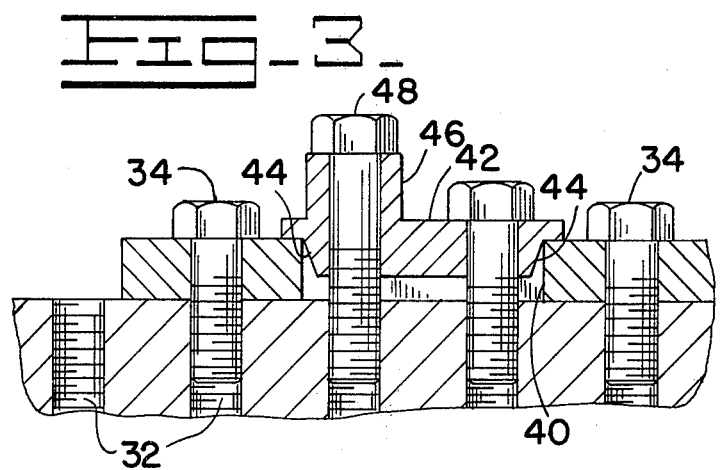
FIG. 3 is a sectional view taken generally along lines III—III of FIG. 2.
Figure 4:
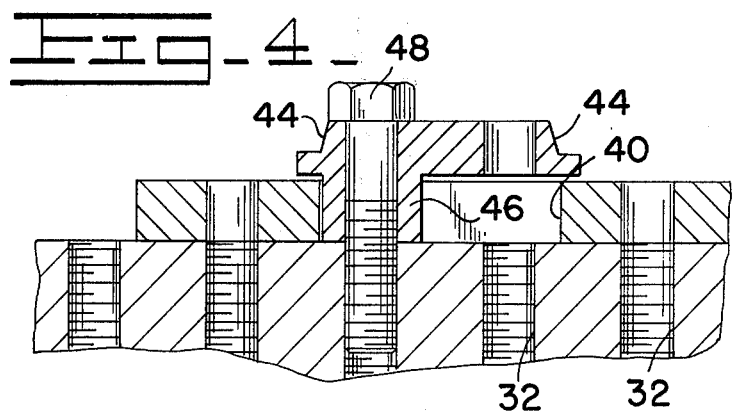
FIG. 4 is a view similar to FIG. 3 with the guide means shown positioned in the guide position.

An elongated slot 40 is formed in each of the arms 14a and 14b and extends along in the direction of the rows of bolt holes to either sides of the arms. Each of these slots as indicated in FIGS. 2–4 span at least two of the bolt holes. A combination of locking and guiding member 42 includes shoulders 44 at each end thereof to cooperatively engage as shown in FIG. 3 the slot 40 for locking the assembly into position for receiving the bolts 34. The member 42 also includes guiding means 46 in the form of a cylindrical sleeve. This portion of the member 42 cooperates as shown in FIG. 4 for guiding and positioning the arms 14a and 14b with respect to the roller frames 16 when these members are moved inward and outward with respect to one another. A special long bolt 48 is provided for this portion of the member 42.

As shown in FIG. 3, the assembly including the arms 14a and 14b are locked into position with respect to the roller frame 16. The roller frame in this position is in its outermost position. Thus, the vehicle has its widest or most stable gauge. The term "gauge" as used herein indicates the width of the vehicle between the tracks. Thus, the vehicle in this position has a wider base from which to support a load when working. Thus, the vehicle when the loaded bucket is formed to the side is less likely to tip over.

Adjustment of the width of the vehicle inward from the position shown in FIG. 2 is accomplished as follows: First, the member 42 is removed and inverted from the locking position shown in FIG. 3 to the guiding position as shown in FIG. 4. Bolts 34 and 36 are then removed from their respective bores. Thereafter, the upper part of the machine or excavator 10 is rotated 90° from the position shown in FIG. 1 to the side opposite the track frame to be repositioned. The bucket 24 is lowered to the ground and an additional downpressure by retraction of the boom cylinder 26 will raise the one track on that side of the vehicle off the ground. By a retraction of the stick cylinder 28, which extends the stick outward, the frame 14 is moved in the direction of arrow 50 until the holes 38 are lined up to receive bolts 36. The bolts 34 and 36 may then be inserted into the respective holes and tightened down. The lock member 42 can then be inverted again to the lock position shown in FIG. 3 and tightened down. The tapered shoulders 44 of the member 42 assures proper alignment of the members.

Repositioning of the opposite track is accomplished in the same manner. Positioning of the track outward is accomplished simply by pulling the frame away from the track assembly to be adjusted by means of the bucket linkage. Thus, from the above, it is seen that there is provided a simple and inexpensive track gauge adjusting means.

While the present invention has been described with respect to a single embodiment, it is to be understood that numerous changes and modifications may be made in the disclosed embodiment without departing from the spirit and scope of the invention as defined in the appended claims.

What is claimed is:

1. A track gauge modifier assembly for a track vehicle having a lower frame including a pair of arms extending outward from each side for connecting to a pair of spaced track roller frame members, the improvement comprising:

adjustable connecting means for adjustably connecting one of said roller frame members to the lower frame member relative to the other roller frame member;

said connecting means comprising a plurality of bolt receiving bores extending through said arms, a plurality of bolt receiving holes formed in said roller frame members and a slot formed in each of said arms spanning a plurality of said holes in said roller frame members in any one of a selected position of adjustment extending in the direction of said adjustment, and terminating at ends defining the innermost and outermost position of said adjustment;

locking means comprising an elongated member having a main body portion extending into said slot means for holding said members in said adjusted position;

bolt receiving bores in said elongated member for alignment with said plurality of holes spanned by said slot; and, guiding means comprising a cylindrical projection extending from the side of said elongated member opposite said main body portion engaging said slot for guiding said frame members between adjusted positions.

2. An adjustable width track assembly for an excavator, said assembly comprising:

a lower frame including a central body portion and a pair of arms extending outward from each side of said body portion;

a track roller frame mounted on each side of said body portion, each having a pair of said arms resting directly thereon for supporting said central body portion;

adjustable connecting means including a plurality of bolt receiving bores extending through said arms, and a plurality of bolt receiving holes formed in said roller frames for adjustably securing each of said track roller frames to each said pair of said arms for adjustment of said roller frames toward and away from said central body portion;

said adjustable means including a slot in each of said arms extending along the direction of said adjustment for spanning a plurality of said holes in said roller frames in any one of a selected position of adjustment;

an invertible member including guide means on one side thereof for engaging said slot for guiding said roller frames during said adjustment; and, said invertible member including lock means on the other side thereof for engaging said slot for retaining said roller frames in a selected position of adjustment.

3. The adjustable track assembly of claim 2 wherein said guide means includes a cylindrical member extending from said one side of said invertible member; and, said lock means includes an elongated portion on said other side of said invertible member.

4. The adjustable track assembly of claim 3 wherein said adjustable means includes a pair of slots in each of said arms, said slots extending parallel along said arms; and, each of said elongated portions engages both ends of a slot.

5. An adjustable width track assembly for an excavator, said assembly comprising:

a lower frame including a central body portion and a pair of arms extending outward from each side of said body portion;

a track roller frame mounted on each side of said body portion;

adjustable connecting means including a plurality of bolt receiving bores extending through said arms and a plurality of bolt receiving holes formed in said roller frames for adjustably securing each of said track roller frames to a pair of said arms for adjustment of said roller frames toward and away from said central body portion;

said adjustable means including a slot in each of said arms extending along the direction of said adjustment and spanning a plurality of said holes in said roller frames in any one of a selected position of adjustment;

locking means comprising an elongated member having a main body portion extending into and engaging said slot for retaining said roller frames in a selected position of adjustment;

bolt receiving bores in said elongated member for alignment with said plurality of holes spanned by said slot; and, guide means comprising a cylindrical projection extending from the side of said elongated member opposite said main body portion for engaging said slot for guiding said roller frames during said adjustment.

6. The adjustable track assembly of claim 5 wherein a pair of said arms is supported on top of one of said track roller frames.

7. The adjustable track assembly of claim 6 wherein each of said arms includes a pair of said slots.

8. The adjustable track assembly of claim 7 wherein said elongated member includes a pair of bolt receiving bores extending therethrough for alignment with a pair of said bolt receiving holes in said roller frame.

9. The adjustable track assembly of claim 8 wherein one of said bolt receiving bores in said elongated member extends co-axially of said cylindrical projection.

* * * * *